Oct. 31, 1967  E. McGRATH  3,350,141

PNEUMATIC OUTLET FOR UNLOADING PARTICULATE MATERIALS

Filed Aug. 22, 1966  4 Sheets-Sheet 1

INVENTOR.
EARLE McGRATH
BY Eugene N. Riddle

ATTORNEY

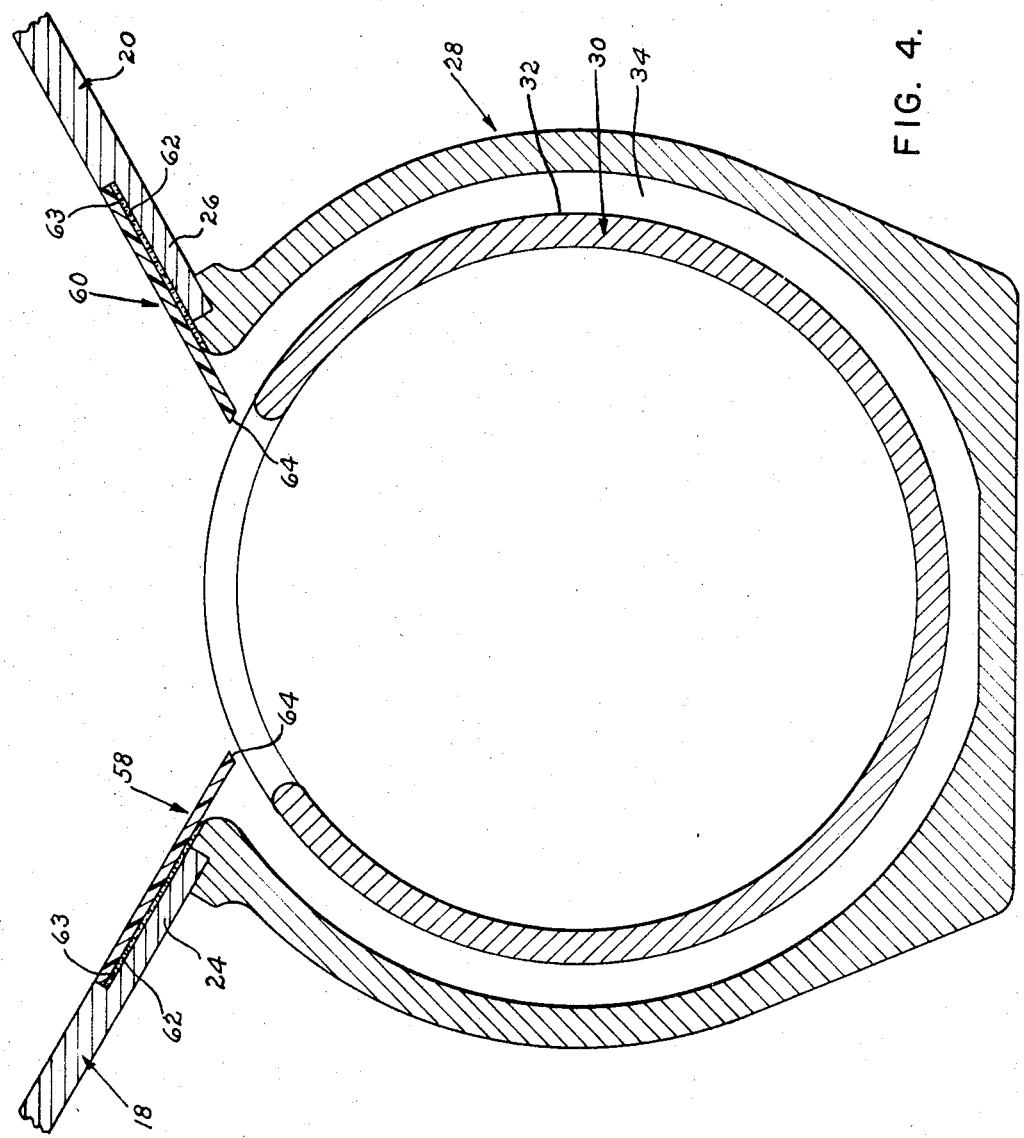

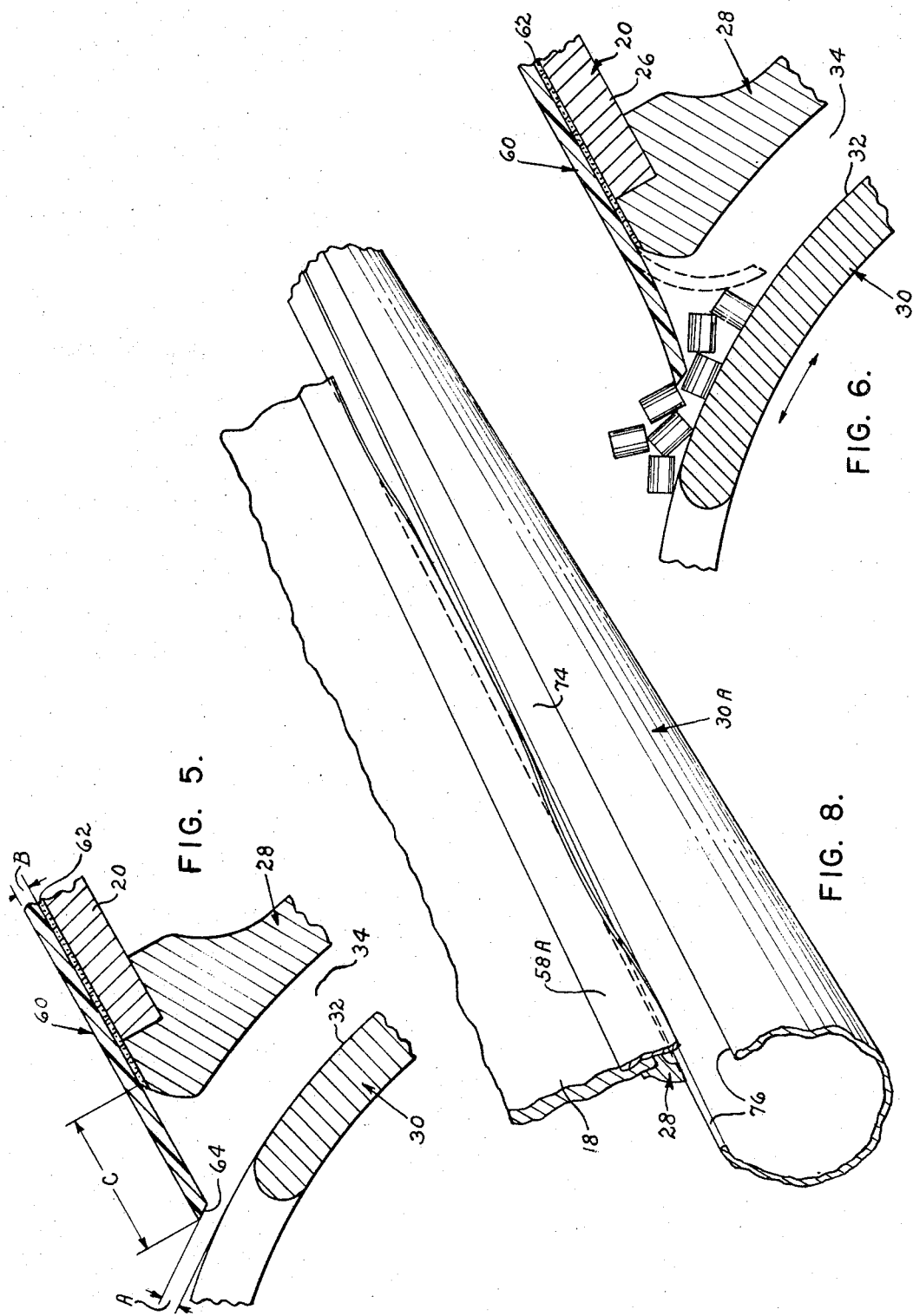

United States Patent Office 3,350,141
Patented Oct. 31, 1967

3,350,141
PNEUMATIC OUTLET FOR UNLOADING
PARTICULATE MATERIALS
Earle McGrath, St. Louis, Mo., assignor to ACF Industries, Incorporated, New York, N.Y., a corporation of New Jersey
Filed Aug. 22, 1966, Ser. No. 574,066
3 Claims. (Cl. 302—52)

ABSTRACT OF THE DISCLOSURE

A resilient lip member having a free edge mounted adjacent a rotatable pneumatic discharge tube in a bottom discharge outlet and flexing to permit particulate material to pass between the tube and lip member upon any binding of the particulate material at the lip member. The lip member is secured within a slot in the adjacent wall structure.

Background and description of the invention

As an example of a pneumatic outlet with which the present invention is particularly adapted for use, reference is made to U.S. Patent No. 3,194,420 dated July 13, 1965, and entitled "Hopper Structure," the entire disclosure of which is incorporated by this reference.

Some of the particulate material transported in railway covered hopper cars, such as styrene and Lucite pellets, is hard, brittle and formed of generally uniformly shaped pellets having relatively sharply defined edges and a length and width of around one-eighth (⅛) inch. As illustrated in the aforementioned Patent No. 3,194,420, metallic generally rigid lips are disposed closely adjacent a rotatable pneumatic discharge tube and are spaced from the tube a distance of between around one-sixteenth (¹⁄₁₆) and one-eighth (⅛) inch. Upon rotation of the tube for pneumatic unloading, the hard pellets sometimes tend to bind between the lips and the adjacent surface of the tube. Such binding resists rotation of the pneumatic tube and causes a high turning torque to be applied. It is possible for the pneumatic tube at times to resist rotation completely when many pellets are tightly wedged or caught between the lips and the outer surface of the pneumatic tube. Normally, plastic pellets which are not quite as hard or brittle as styrene or Lucite tend to pass between the lips and the outer surface of the tube without any binding of the tube.

The present invention comprises a separate flexible lip or lip member mounted adjacent a rotatable pneumatic tube for flexing relative to the adjacent side walls, the lip members having sufficient flexibility to give and flex when hard particulate material tends to bind between the lip member and the tube upon rotation of the tube thereby to pass the material, but yet being of a sufficient stiffness to support the adjacent particulate material without collapsing. The lip member must also provide an effective air seal between the tube and adjacent outlet structure and be of a sufficient resilience to return to its original position after any particulate material deforms the lip member and passes between the lip member and adjacent pneumatic tube.

The invention accordingly comprises the constructions hereinafter described, the scope of the invention being indicated in the following claims.

In the accompanying drawings, in which several possible embodiments of the invention are illustrated, FIGURE 1 is a perspective of an outlet structure embodying the present invention and illustrating a flexible lip adjacent a rotatable pneumatic tube;

FIGURE 4 is an enlarged transverse section of the outlet structure shown in FIGURES 1–3;

FIGURE 5 is an enlarged fragment of FIGURE 4 illustrating the flexible lip adjacent the pneumatic tube;

FIGURE 6 is an enlarged section similar to FIGURE 5 but illustrating the flexible lip in a position permitting particles to pass between the lip and the adjacent tube;

FIGURE 8 is a partial perspective illustrating a pneumatic tube having a modified slot arrangement.

Corresponding reference characters indicate corresponding parts throughout the several views of the drawings.

Figure 1:
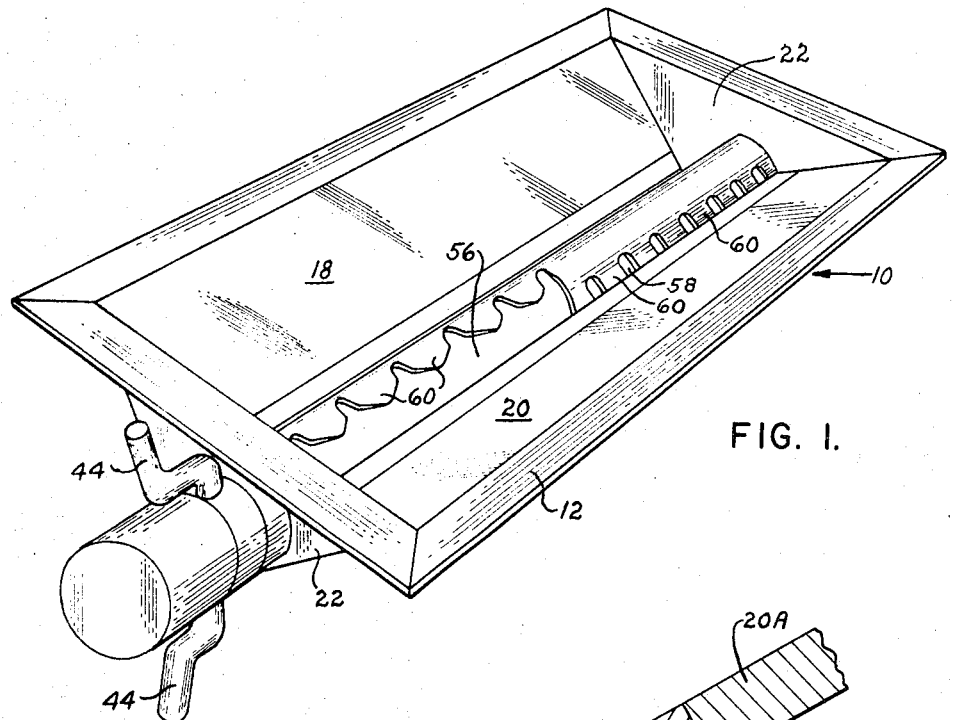
Figure 2:
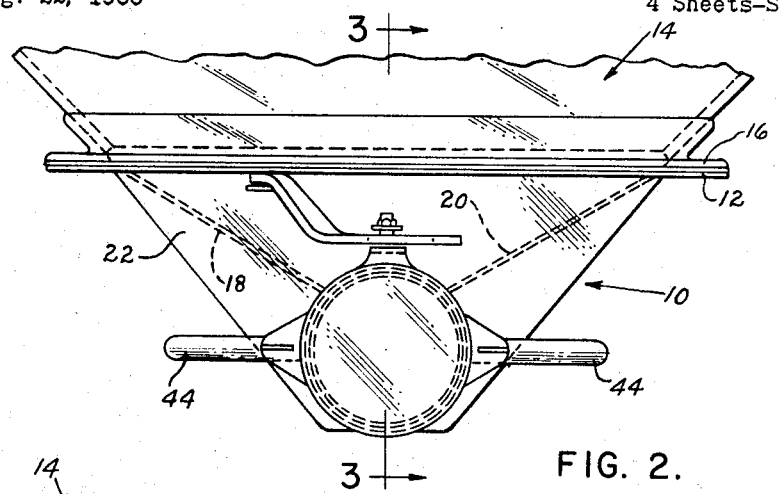
FIGURE 2 is an end elevation of the outlet structure shown in FIGURE 1.
Figure 3:
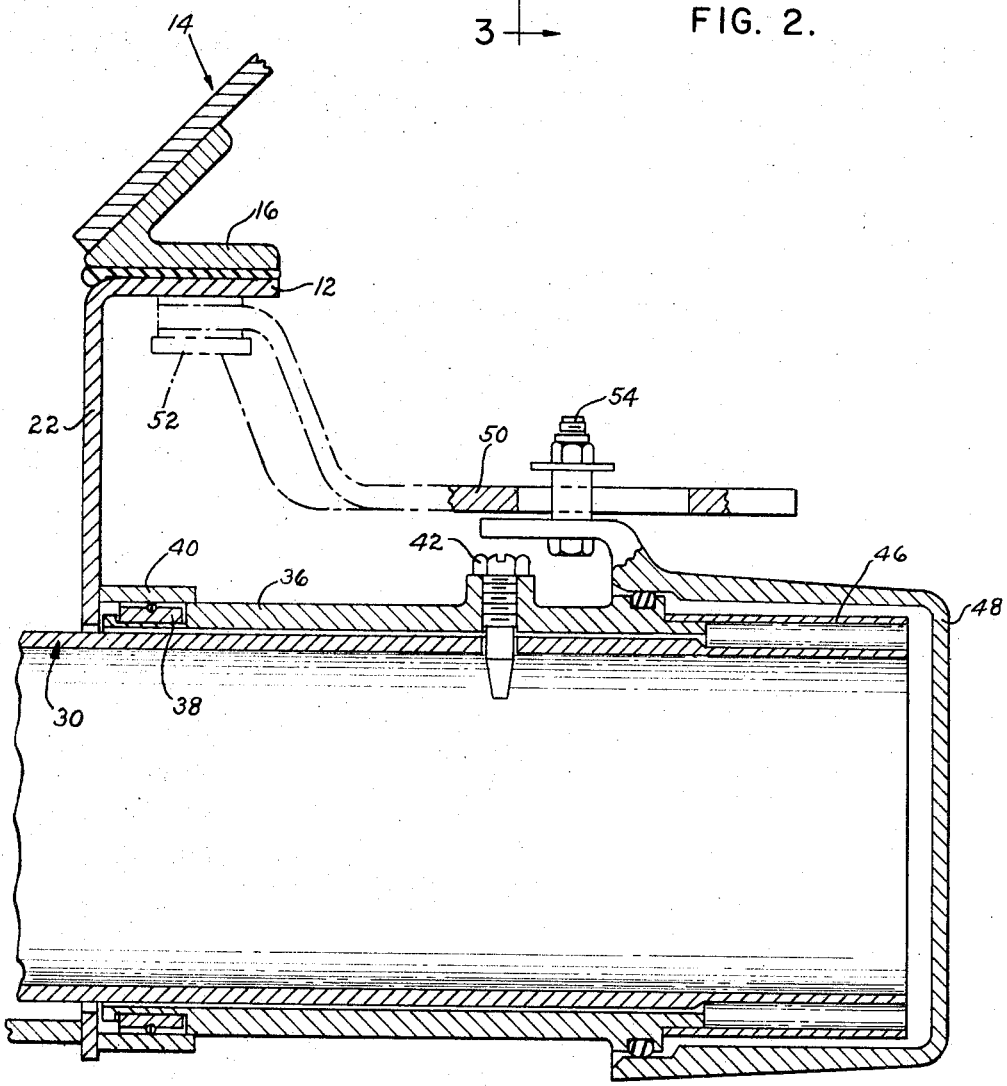
FIGURE 3 is a partial section taken generally along line 3—3 of FIGURE 2.

Referring to FIGURES 1–3 of the drawings, an outlet structure is generally indicated 10 and has a generally rectangular upper peripheral flange 12. A hopper structure generally indicated 14 has a corresponding lower peripheral flange 16 to which flange 12 may be suitably secured, such as by welding. Hopper structure 14 comprises a portion of a covered hopper railway car.

Outlet structure 10 includes side walls 18 and 20 sloping downwardly from flange 12 at an angle around thirty (30) degrees with respect to the horizontal. End walls 22 extend vertically between walls 18 and 20 to form a generally shallow trough-shaped structure. Side walls 18 and 20 have respective lower end marginal portions 24 and 26 spaced from each other as shown in FIGURE 4. Extending between and closing the marginal portions 24 and 26 is a generally U-shaped housing generally designated 28 forming a channeled or furrowed bottom for outlet structure 10. Fitting within U-shaped housing 28 is a metering valve or tube generally designated 30 and having an outer circumferential arcuate surface 32. The outer surface 32 of tube 30 is spaced from the inner surface of housing 28 and forms a chamber 34 therebetween.

Each end of metering valve 30 fits within an outer sleeve 36. Secured to the inner end of each sleeve 36 is an inner bearing ring 38 supported within an outer bearing ring 40 which, in turn, is secured to the adjacent end wall 22. A set screw 42 holds pneumatic discharge tube 30 and sleeve 36 together for rotation. Extending outwardly from sleeve 36 are handles 44 which may be gripped to rotate tube 30 and sleeve 36. An outer tubular extension 46 is fitted about the outer end of sleeve 36 and is adapted for connection to a vacuum hose or the like (not shown) for pneumatically unloading material from outlet structure 10. An end cap 48 extends about each end of metering tube 30 to protect the ends of tube 30 and prevent the entrance of moisture or foreign matter. A slotted Z-shaped support member 50 is pivoted at 52 to flange 12 and receives a bolt 54 secured to cap 48. Cap 48 may be removed upon outward longitudinal movement axially of tube 30 with bolt 54 moving relative to Z-shaped member 50. Cap 48 may be swung away from tube 30 about the pivot formed by bolt 54 after being removed from the end of extension 46.

It is to be understood that particulate material within outlet structure 10 may be unloaded from either end of tube 30, as desired. End cap 48 at each end of tube 30 is normally removed when the material is unloaded, air being drawn in tube 30 from one end and the material being discharged from the opposite end of tube 30. Outlet structure 10 may be four (4) or five (5) feet in length which sometimes present difficulties in initially rotating tube 30 from a closed position for a discharge of lading. One reason for a high rotational force being required for turning tube 30 is in the binding of particles between the tube and the adjacent end portions 24 and 26 of side wall 18, 20. Tube 30 has a pair of staggered slot portions 56 and 58 to receive the particles from the outlet structure for unloading. Spaced teeth 60 define the sides of slot portions 56 and 58 and aid in minimizing binding of the particles. For further details of the slot arrangement, reference is made to the aforementioned Patent No. 3,194,420.

At times, a binding of particles or particulate material occurs between the adjacent end portions 24, 26 of the sidewalls and tube 30, especially when the particles are very hard, such as styrene and Lucite pellets having a dimension between about one-sixteenth (1/16) and one-eighth (1/8) inch. The edge defining the tube slot shears soft particles which tend to bind at the tube but hard particles are difficult to shear.

To permit particles to pass into chamber 34 between housing 28 and tube 30 when the particles bind adjacent end portions 24 and 26, a flexible lip arrangement comprising the present invention is provided. Referring to FIGURES 4, 5, and 6, lips 58 and 60 are secured respectively to lower end portions 24 and 26 at the juncture of housing 28 therewith. Each lip 58, 60 is substantially identical and is preferably formed of a resilient and flexible material. A material which has been found satisfactory is a cast urethane material produced by Armstrong Cork Company, Industry Products Division, Lancaster, Pennsylvania, and identified as PO–652. The urethane material has a thickness of one-sixteenth (1/16) inch, a width of two (2) inches, and a hardness of ninety-five (95) points as measured by Shore A durometer. Other resilient materials having suitable elastomeric and/or plastic characteristics have been employed satisfactorily, such as nylon, for example.

Lips 58 and 60 are secured to side walls 18 and 20 by a suitable layer of adhesive 62. An adhesive which has been found to be satisfactory is adhesive EC–2216 produced by Minnesota Mining and Manufacturing Company, Adhesives, Coatings and Sealers Division, 900 Bush Ave., St. Paul 6, Minnesota. Adhesive EC–2216 has an epoxy resin base and may be applied by a knife coating, spatula, or trowel. An indentation or groove 63 in side walls 18 and 20 receives lips 58, 60 with the upper surfaces of lips 58, 60 forming a continuation of the upper surfaces of walls 18 and 20 thereby to maintain a uniform slope. In the event it is desired to secure lips 58, 60 directly to the upper surfaces of walls 18 and 20 without any grooves being formed to receive the lips, it may be desirable to extend the secured supporting portions of the lips along the entire upper surfaces of side walls 18 and 20 so that no change in slope along side walls 18 and 20 occurs to possibly hinder the flow of lading.

A free edge 64 of lips 58, 60 is disposed closely adjacent tube 30 and preferably around one-sixteenth (1/16) inch from the adjacent surface of tube 30. In some instances, resulting from flexure of tube 30 along its length, free edge 64 may contact tube 30 and work satisfactory. However, distance A as shown in FIGURE 5 should not exceed around one-eighth (1/8) inch in order for lips 58, 60 to function effectively and to provide an effective air seal between tube 30 and the adjacent housing 28 to prevent an excessive loss of air between tube 30 and chamber 34. While lips 58, 60 have been preferably defined as being of a thickness of one-sixteenth (1/16) inch, a thickness B between about 1/32 and 1/8 inch will function satisfactory. As lips 58, 60 must bend or flex in order to pass particles which tend to bind between free edges 64 and tube 30, lips 58, 60 must be resilient and must be of a sufficient resilience to return to their original position and to support particles thereon which are not caught between the lips and tube 30. A hardness as measured in Shore A durometer points of between about forty (40) and one hundred twenty-five (125) has been found to function effectively within the dimensions specified above for lips 58 and 60. An unsupported width C of lips 58, 60 as shown in FIGURE 5 of at least around three-eighths (3/8) inch has been found to be desirable in order to permit lips 58, 60 to flex or bend adequately.

As shown in FIGURE 6, lips 58, 60 may flex either downwardly or upwardly and will follow a somewhat sinuous back and forth bending lengthwise of tube 30. The ends of lips 58, 60 adjacent end walls 22 are unsecured but fit closely adjacent end walls 22. The particles which pass lips 58, 60 and are received within chamber 34 are to a large extent removed pneumatically from chamber 34 through the slot area in tube 30 as tube 30 is rotated downwardly.

Figure 7:
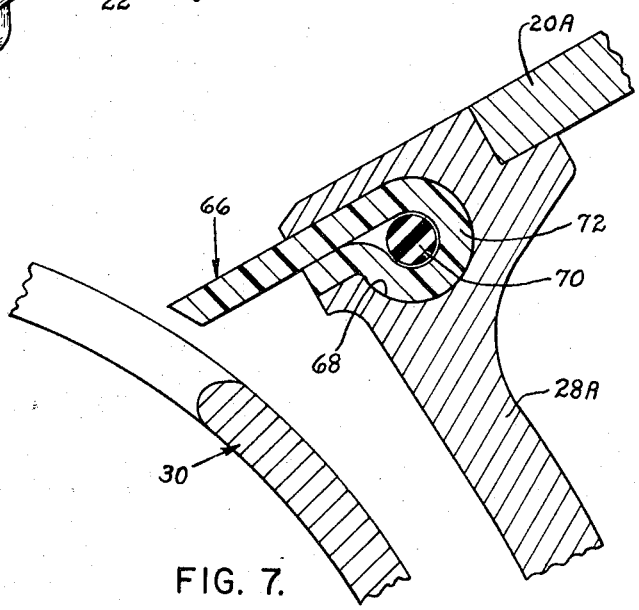
FIGURE 7 is a section of a modified flexible lip arrangement illustrating a flexible lip secured within an adjacent slot or recess.

Referring to FIGURE 7, a modified embodiment of the invention is illustrated in which lip 66 fits within a recess or slot 68 formed at the juncture of housing 28A and side wall 20A. An elongate rod 70 is received within an opening formed within a bulbous portion or loop 72 opposite the free edge of lip 66 after lip 66 is positioned within slot 68. Rod 70 suitably extends between the end walls of the associated outlet structure and is secured therto.

Referring to FIGURE 8, a fragment of a modified pneumatic tube 30A is illustrated in perspective. Tube 30A has a slot 74 defined by parallel edges 76 which extend longitudinally at an angle with respect to the free edge of adjacent flexible lip 58A and at an angle to the longitudinal rotational axis of tube 30A. Slot 74 as well as slot portions 56 and 58 in the embodiment of FIGURES 1–6 provide an arrangement in which a progressively increasing portion of the edge defining the slot clears the adjacent lip to provide a progressively increasing length of the slot area as the pneumatic tube is rotated in one direction. Thus, the entire length of the slot area is not exposed simultaneously but is exposed gradually as the tube is rotated. Further, the rotation of the tube in an opposite direction effects a camming action between any particles at the restriction formed between the lip and the edge defining the slot thereby to minimize binding of the metering tube thereat.

From the foregoing, it will be understood that a pneumatic outlet has been provided in which a separate resilient lip is disposed adjacent a rotatable pneumatic tube, the lip having a sufficient resilience to give when hard particulate material tends to bind between the lip and tube upon rotation of the tube thereby to pass the material while providing an effective air seal thereat, but being of a sufficient stiffness to support the particulate material without collapsing. The lip may be employed in combination with a pneumatic tube having a slot arrangement which exposes a progressively increasing portion of the longitudinal edge defining the slot as the tube is rotated thereby tending to cam particles caught between the lips and adjacent tube. These features tend to minimize any binding of the rotatable tube which might occur upon rotation thereof.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. An outlet structure for pneumatically unloading particulate material comprising, a pair of generally opposed side walls sloping downwardly toward each other in a generally smooth relation and having spaced lower portions, an open generally bowl-shaped housing extending downwardly between the spaced lower portions of said side walls, a metering tube disposed within said housing and having a slot extending longitudinally thereof to receive the particulate material flowing downwardly along the side walls for pneumatic unloading, means to rotate said tube about its longitudinal axis to position the slot in the area between the lower portions of said side walls thereby to permit the particulate material to flow into the tube for pneumatic unloading, a separate lip member generally at the juncture of each lower portion with the housing and extending toward the pneumatic tube with the free edge thereof adjacent the tube, said lip members being formed of a resilient material having a sufficient stiffness to support the adjacent particulate material without collapsing and having a bulbous end portion opposite said free edge with an opening therein extending longitudinally of the metering tube, a slot at each juncture facing the adjacent metering tube and receiving the bulbous end portion of the adjacent lip member, and lip securing means extending within the opening of each lip member to secure the lip members adjacent said junctures for flexing movement relative to said side walls whereby the lip members flex to permit the particulate material to pass between the lip members and the adjacent tube when the particulate material tends to bind between the lip members and tube.

2. An outlet structure for pneumatically unloading particulate material comprising, a pair of generally opposed side walls sloping downwardly toward each other in a generally smooth relation and having spaced lower portions, an open generally bowl-shaped housing extending downwardly between the spaced lower portions of said side walls, a metering tube disposed within said housing with the outer surface of the tube being spaced from the inner surface of said housing to form a material receiving chamber therebetween, a separate lip member above the tube at the juncture of each lower portion with the housing and extending therefrom toward the tube with the free edge thereof closely adjacent the tube, said metering tube having a generally longitudinally extending slot to permit entry of lading from the outlet structure into the conduit structure when the slot is positioned between said spaced lower portions, means to rotate said tube about its longitudinal axis to position the slot in the area between the lower portions of said side walls thereby to permit the particulate material to flow into the tube for pneumatic unloading, and a longitudinal edge defining a portion of said slot disposed generally adjacent one of the lip members during pneumatic unloading and extending for at least a substantial portion of the length of said conduit structure, said longitudinal edge having a major portion thereof extending longitudinally at an angle to the longitudinal axis of said one lip member so that upon rotation of said metering tube in one direction when said longitudinal edge is disposed generally adjacent said one lip member a progressively increasing portion of the longitudinal edge clears said one lip member to provide a progressively increasing length of the slot, the rotation of the metering tube in an opposite direction effecting a camming action against any particulate material at the restriction formed between said one lip member and the longitudinal edge thereby to minimize binding of the metering tube thereat, each lip member being formed of a resilient material having a sufficient stiffness to support the adjacent particulate material without collapsing and having a bulbous end portion opposite said free edge with an opening therein extending longitudinally of the metering tube, a slot at each juncture facing the adjacent metering tube and receiving the bulbous end portion of the adjacent lip member, and lip securing means extending within the opening of each lip member to secure the lip members adjacent said junctures for flexing movement relative to said side walls whereby the lip members flex to permit the particulate material to pass between the lip members and the adjacent tube into the material receiving chamber when the particulate material tends to bind between the lip members and the tube.

3. An outlet structure as set forth in claim 2 wherein each separate lip member is of a thickness between about $\frac{1}{32}$ and $\frac{1}{8}$ inch and is less than $\frac{1}{8}$ inch from said tube.

References Cited
UNITED STATES PATENTS

| | | | |
|---|---|---|---|
| 3,105,721 | 10/1963 | Collins et al. | 302—52 |
| 3,194,420 | 7/1965 | Kemp et al. | 302—52 X |
| 3,215,473 | 11/1965 | Kemp et al. | 302—52 |

SAMUEL F. COLEMAN, *Primary Examiner.*